A. McCLENEGHAN.
COMBINED SIGNAL AND NUMBER HOLDER.
APPLICATION FILED FEB. 5, 1918.
1,283,835.                                            Patented Nov. 5, 1918.
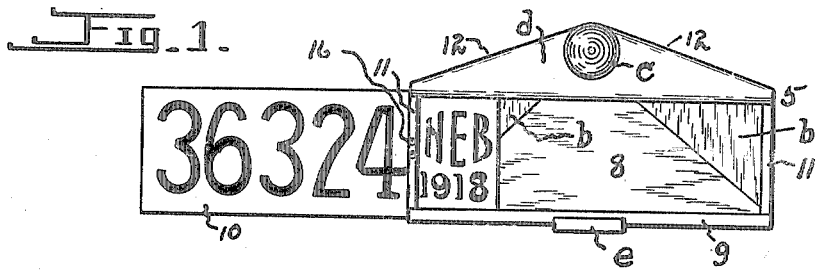
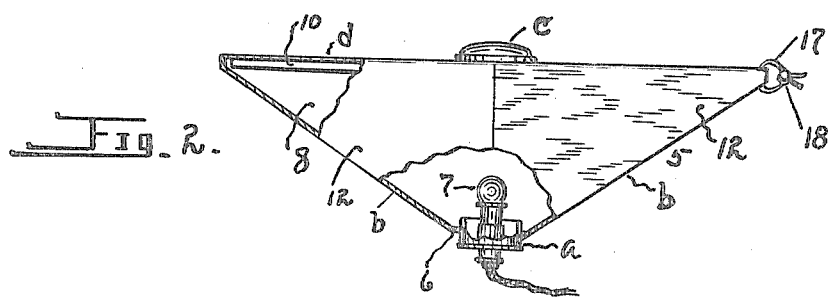
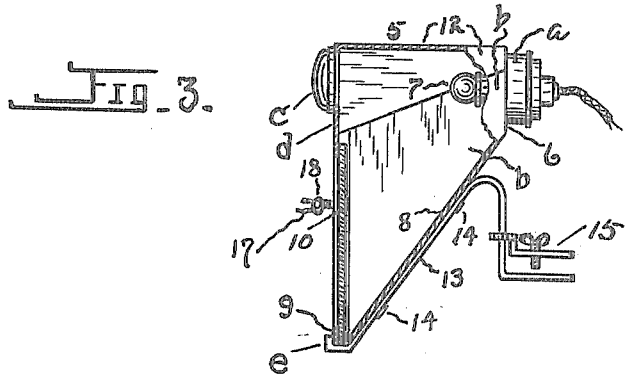
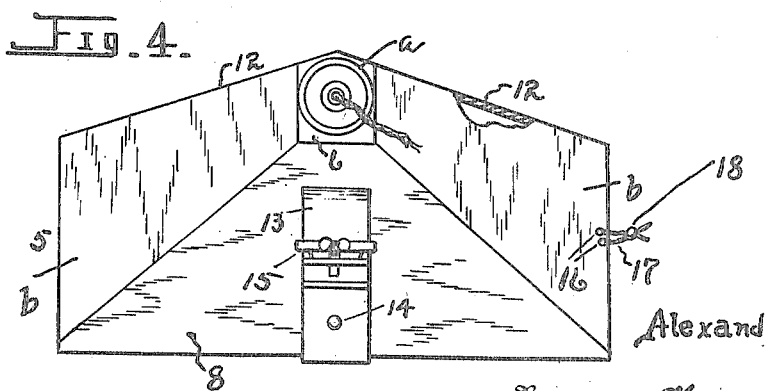
Inventor
Alexander McCleneghan,
By
Hiram A. Sturges,
Attorney

UNITED STATES PATENT OFFICE.

ALEXANDER McCLENEGHAN, OF OMAHA, NEBRASKA.

COMBINED SIGNAL AND NUMBER-HOLDER.

1,283,835.

Specification of Letters Patent.

Patented Nov. 5, 1918.

Application filed February 5, 1918. Serial No. 215,558.

*To all whom it may concern:*

Be it known that I, ALEXANDER MCCLENE-GHAN, a citizen of the United States, residing at Omaha, in the county of Douglas and State of Nebraska, have invented certain new and useful Improvements in Combined Signals and Number-Holders, of which the following is a specification.

This invention relates to a combined signal and number-holder for vehicles, and more particularly for automobiles, and has for its object to provide a casing which may be conveniently and economically constructed and may be readily secured to the rear part of the vehicle to exhibit the license number during daytime or at night, the device to be so constructed that the electric light employed for illuminating the numbers at night will also illuminate a required colored signal or light.

The invention consists of the novel construction, combination and arrangement of parts as described herein and claimed, and as illustrated in the accompanying drawing, it being understood that minor changes in details may be made without departing from the spirit of the invention, in accordance with the appended claim.

In the drawing, which illustrates one embodiment of the invention, Figure 1 is a front view of the combined signal and number-holder, the transparent number-plate being partly drawn to show the interior of the casing. Fig. 2 is a partly broken plan view of the same. Fig. 3 is a view of the device in longitudinal section. Fig. 4 is a rear view of the device.

Referring now to the drawing for a more particular description, I provide the casing 5 having a rear wall 6 of limited area for a mounting thereon of a socket or housing $a$ to support the electric light 7, said casing having a downwardly and forwardly inclined bottom 8 formed divergent from the wall 6 and provided near its front edge with an upset flange 9 for supporting a transparent plate 10 for bearing a license number or other designating characters, said casing having its sides $b$ projecting forwardly and divergingly from said wall 6 to provide flanges 11 at the ends of the casing, the top 12 of the casing preferably having a height which is uniform at its medial line to permit the rays of light to effectively illuminate the semitransparent signal $c$, this member consisting generally of a glass bulb of red color, the wings of the top 12 having a suitable pitch, as shown, so that material may be conserved, the signal $c$ being suitably mounted in an aperture formed in the gable $d$ which, in part, supports the slidable number-plate.

Numeral 13 indicates a bracket having a flange $e$ for engaging the flange 9 at the front of the casing, and by means of suitable keepers 14 the bracket may be secured to the bottom 8, midway between the ends of the device, said bracket being provided with a suitable clamp 15 for securing the device to the rear part of an automobile or other part of a vehicle requiring the exhibition of a license number and conforming to regulations requiring exhibition of a red light or similar signal at night.

Among some of the advantages to be derived by use of the invention it may be stated that on account of the form of the device it will not be obtrusive when applied to an automobile and that a limited amount of material, only, will be required in its manufacture. Also the light will be reflected to advantage on account of the inclined sides and bottom, and it will be seen that the numbers or designating characters may be larger, in proportion to other parts, than by any other construction. On account of the location of the signal light $c$ its illumination will occur without any artificial light, other than the member 7, which is a feature of convenience and economy. Numerals 16 indicate apertures formed in the flange 11 and in one of the sides $b$ for receiving strands 17 which, normally, are connected by a seal 18 to prevent unwarranted substitution of one plate 10 for another, or changing the license number.

It is understood that a casing for the purpose mentioned will be subjected to severe vibration and stresses incident to the use of an automobile, but on account of the construction, as described, it is believed that the parts are so supported and arranged that they will not be injured. During daylight the number-plate will be visible, as usual, and at night the illumination, as described, is depended upon.

Having fully described my invention, what I claim and desire to secure by Letters Patent is,—

In devices for the purpose described, a casing having a vertical back and an opening in its front, and having its sides and bottom formed forwardly divergent and provided with flanges, the top of said casing being formed downwardly inclined from its medial line to its sides, a transparent plate bearing designating characters and adapted to be disposed in engagement with said flanges to make a closure of the opening in the front of the casing, a semitransparent signal disposed at the medial line in that part of the front above said opening, and an agent mounted in the back of the casing for illuminating the transparent plate and semitransparent signal.

In testimony whereof, I have affixed my signature in presence of two witnesses.

ALEXANDER McCLENEGHAN.

Witnesses:
 HIRAM A. STURGES,
 ARTHUR H. STURGES.